Jan. 31, 1950     H. E. SCHUMACHER     2,496,023
STYLUS
Filed May 9, 1946

Henry E. Schumacher INVENTOR.
BY Bush & Bush,
His Attorneys.

Patented Jan. 31, 1950

2,496,023

UNITED STATES PATENT OFFICE 2,496,023

STYLUS

Henry E. Schumacher, Davenport, Iowa, assignor of one-third to J. Clay Thompson and one-third to A. G. Bush, both of Davenport, Iowa Application May 9, 1946, Serial No. 668,440

16 Claims. (Cl. 33—23)

My invention relates to an improvement in profiling machines.

The objects of my invention are to provide an adjustable form of stylus or tracer for use in profiling machines which will permit adjustment to take up any slack caused by wear in the cutting member; to provide means for adjusting the distance between the center of the stem of the stylus and the point of contact between the stylus and the pattern to be traced or followed whereby allowance can be made for wear of the cutting member of the profiler and the necessity of changing cutters to remedy such wear can be avoided; to provide means whereby a single cutting member of a profiling machine can be continued in use after becoming worn to or beyond the limit of tolerance for a given piece of work; to provide means whereby a circular cutter can be used upon a profiling machine and the contact point of the stylus can be adjusted to correspond to and compensate for wear of the cutting member.

I accomplish these objects by the means illustrated in the accompanying drawings, in which—

Figure 1:
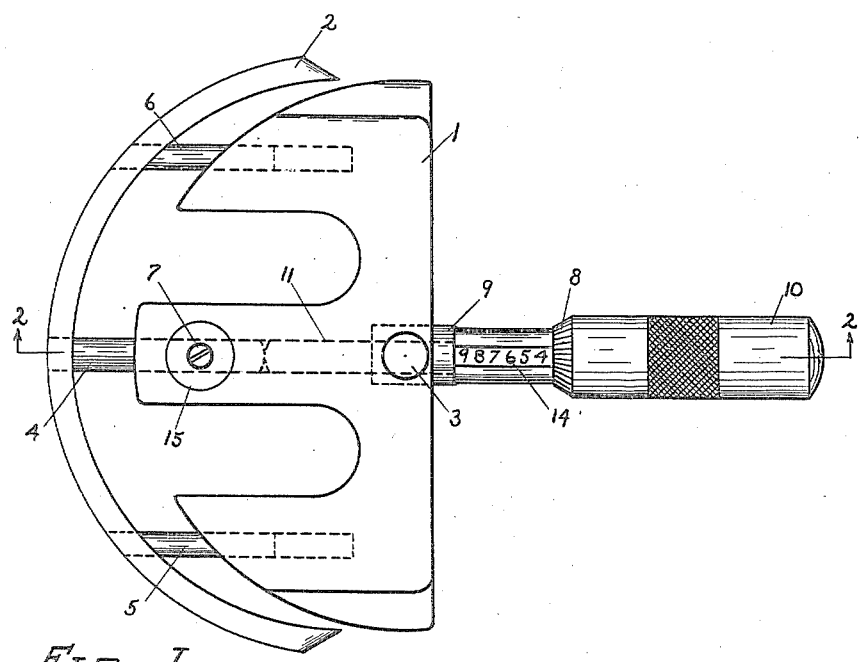
Figure 1 is a plan view of my improved stylus.
Figure 2:
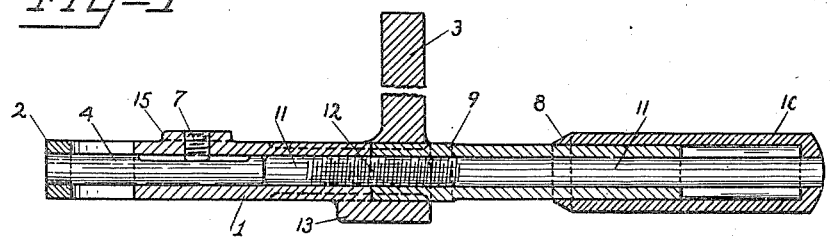
Figure 2 is a vertical section on the line 2—2 of Figure 1.

My apparatus comprises a stem or shaft 3 adapted to be secured in the tracer shaft of a profiling machine. The lower end of this stem is rigidly united to a body or plate 1 of approximately semi-circular form but with bores formed in the body thereof to permit insertion of the rods or fingers to support an arcuate bar.

This body 1 has slidingly united thereto an arcuate bar 2 secured in the same plane as the body by a plurality of transverse rods 4, 5 and 6 seated in and slidably adjustable longitudinally in suitable bores formed in the body and with their outer ends rigidly united to the arcuate bar 2.

A set screw 7 is threaded into a suitable bore formed in a boss 15 on the body 1, arranged to contact the rod 4 to secure it in a given position of adjustment, and the upper portion of the rod 4 is flattened to afford a firmer grip for the set screw 7.

A micrometer tube 9 is secured in the rear edge of the body 1 and the boss 13 formed integral with the body to afford a firmer seat for the tube 9, by a press fit or other suitable means. The tube 9 is provided with internal threads 12 which correspond to and mesh with similar external threads formed on a shaft or bar 11 which projects into the body far enough to contact the inner end of the rod 4 and drive it outwardly when the shaft or bar 11 is carried inwardly by the threads 12 as it rotates.

The outer end of the shaft or bar 11 is rigidly united to the outer end of a sleeve 10 and rotates therewith when the sleeve is manually rotated in either direction. When the sleeve is rotated in one direction, it will carry the shaft 11 inwardly and cause it to push against the inner end of the rod 4 thereby forcing the rod 4 and rim 2 outwardly and away from the body 1. When the sleeve 10 is rotated in the other direction, it withdraws the shaft or bar 11 from the end of the rod 4 to permit the rod 4 and the arcuate bar 2 to be manually moved inwardly into close contact with the arcuate or front edge of the body 1.

The tube 9 is provided with a suitable micrometer scale 14 and the inner end of the sleeve 10 is preferably beveled and is provided with an annular micrometer scale 8. The scales 14 and 8 are well known and in common use in micrometers and I make no claim to such scales separately.

In the use of my apparatus, the stem 3 is secured in the stylus shaft or holder of the profiling machine with the outer face of the arcuate bar in contact with the edge of a pattern mounted upon the machine bed and to be followed or duplicated.

A rotary cutter corresponding in radius to the radius of the stylus body and arcuate bar as adjusted, is then secured on the cutter shaft of the profiler. When the machine is started in the usual way, the cutter continues to cut until it has been worn enough to reduce its radius to the limit of allowance permitted for the particular work in hand—for instance, five one-thousandths of an inch, more or less. The machine is then stopped, the set screw loosened and the micrometer sleeve 10 rotated far enough to allow the rod 4 and the arcuate bar 2 to be moved inwardly five one-thousandths of an inch. The set screw is then tightened and the machine started and the work proceeds as before.

When another five one-thousandths of an inch has been worn from the edges of the cutter teeth, the adjusting operation described is repeated, and so on so long as necessary.

In this way, the necessity of changing cutters from time to time to install a cutter five one-thousandths of an inch larger in radius in each case, is avoided. This in turn avoids the delay, labor and expense necessary to prepare new cutting members whenever a cutter becomes worn.

By the use of my adjustable stylus, a great saving both of time, labor and material is made, for instead of putting on a new cutter every time five one-thousandths of an inch of wear has occurred, the stylus is adjusted five one-thousandths of an inch, with the same result as if a cutter five one-thousandths of an inch larger had been installed.

It is obvious that such adjustments can be made to conform to the specified limits of allowance for each particular job, whether such allowance be two one-thousandths or five one-thousandths of an inch, or any other specified figure.

It is also obvious that changes in the size, proportion and arrangement of the parts may be made in my stylus and it may be adapted to various types of machines without departing from the spirit of my invention and I do not limit my claims to the precise forms shown in the drawings.

When the cutter becomes worn, it is frequently necessary to resharpen it by grinding, which also reduces the diameter or radius thereof. In such cases, the cutter can be ground and replaced and the stylus adjusted to accommodate the reduced size of the cutter.

I claim:

1. In a profiling machine, a stylus or tracer having a vertical stem or shaft with a flat body rigidly united to the lower end thereof, said body being substantially semi-circular in form, horizontal parallel bores extending into the body from the arcuate edge thereof, an adjustable arcuate bar substantially parallel to the arcuate edge of the body and rigidly united to transverse rods slidable and adjustably seated in said bores, said rods being arranged to hold the arcuate bar in a common plane with the body and either in contact therewith or in parallel spaced relation to the arcuate edge of the body.

2. In a profiling machine, the combination with a stylus or tracer having an upright stem or shaft, of a flat transverse body rigidly united to the stem at a right angle to the stem, horizontal parallel bores formed in said body extending inwardly from one edge thereof, a semi-circular arcuate bar adjustably mounted in a common plane with said body by transverse rods rigidly united to the arcuate bar and slidable in said bores whereby the arcuate bar may be held in a common plane with the body and at various radial distances from the stem.

3. In a profiling machine, a stylus or tracer comprising a flat, semi-circular body, a stem with one end rigidly united to said body at a right angle thereto, parallel bores extending into the body from one edge thereof, transverse parallel rods slidingly mounted in said bore, an arcuate bar rigidly mounted upon the outer ends of the transverse rods substantially parallel to the arcuate face of the body, a set screw seated in the body arranged to bear against one of said transverse rods to secure the arcuate bar in adjusted position relative to the body.

4. In a profiling machine, a stylus or tracer comprising a flat, semi-circular body, a stem with one end rigidly united to said body at a right angle thereto, a radial horizontal bore extending into the body from the arcuate edge thereof, a transverse rod slidingly mounted in said bore, an arcuate semi-circular bar rigidly mounted upon the outer end of the transverse rod substantially parallel to the arcuate face of the body, and means threaded into the body arranged to bear against said transverse rod to secure the arcuate bar in adjusted position.

5. A stylus as described in claim 4, in combination with a micrometer having a shaft co-axial with the transverse rod and longitudinally movably mounted in said horizontal bore adjacent the inner end of said transverse rod.

6. In a profiling machine, the combination with a stylus or tracer having an upright stem and a semi-circular transverse body rigidly united to the stem at a right angle thereto, a radial horizontal bore formed in said body extending inwardly from the middle of the arcuate edge thereof, a semi-circular arcuate bar adjustably mounted in a common plane with said body upon a transverse rod having its outer end rigidly united to the middle of the arcuate bar and its inner end slidably mounted in said bore whereby the arcuate bar may be secured at varying distances from the stem.

7. A combination as described in claim 6, and a micrometer having a shaft co-axial with the transverse rod and longitudinally movably mounted in said horizontal bore adjacent the inner end of said transverse rod.

8. A combination as described in claim 2, and a set screw seated in the body arranged to bear against one of said transverse rods and firmly secure the arcuate bar in adjusted position.

9. A stylus as described in claim 1, and a micrometer united to the body having a shaft arranged to contact one of said transverse rods and to force it outwardly in its bore when the micrometer sleeve is rotated in one direction.

10. A combination as described in claim 2, and a micrometer united to the body having a shaft arranged to contact one of said transverse rods and to force it outwardly in its bore when the micrometer sleeve is rotated in one direction.

11. A stylus as described in claim 1, a micrometer united to the body having a shaft arranged to contact one of said transverse rods and to force it outwardly in its bore when the micrometer sleeve is rotated, and a set screw seated in the body arranged to contact one of the transverse bars and lock it in adjusted position.

12. A combination as described in claim 2, a micrometer united to the body having a shaft arranged to contact one of said transverse rods and to force it outwardly in its bore when the micrometer sleeve is rotated, and a set screw seated in the body arranged to contact one of the transverse bars and lock it in adjusted position.

13. In a profiling machine, a stylus or tracer having a stem or shaft with a semi-circular body rigidly united to one end thereof, adjustable spacing means arranged in spaced relation to the arcuate edge of the body, and transverse supporting means rigidly united to the spacing means arranged to support it in radially adjusted relation to the body and in a common plane with the body.

14. A stylus as described in claim 13, and threaded means seated in the body arranged to lock said spacing means in adjusted position.

15. A stylus as described in claim 13, means seated in the body arranged to lock said spacing means in adjusted position, and micrometer means united to the body having means arranged to contact said supporting means and adapted to force it outwardly when the micrometer means is manually actuated in one direction.

16. A stylus as described in claim 13, means seated in the body arranged to secure or to release said spacing means in adjusted position, and micrometer means united to the body having means arranged to contact said supporting means and adapted to force it outwardly when the micrometer means is manually actuated in one direction and to permit it to be manually retracted when actuated in the other direction.

HENRY E. SCHUMACHER.

REFERENCES CITED

The following references are of record in the file of this patent:

UNITED STATES PATENTS

| Number | Name | Date |
| --- | --- | --- |
| 1,298,677 | Dollscheck | Apr. 1, 1919 |
| 1,300,520 | Tritsch | Apr. 15, 1919 |
| 2,321,888 | Baracskai | June 15, 1943 |